DIVERSITY SYSTEM

Filed March 1, 1948 2 SHEETS—SHEET 1

INVENTOR
THOMAS T. N. BUCHER
BY [signature]
ATTORNEY

INVENTOR
THOMAS T.N. BUCHER
BY
ATTORNEY

Patented Oct. 30, 1951 2,572,912

UNITED STATES PATENT OFFICE

2,572,912

DIVERSITY SYSTEM

Thomas T. N. Bucher, Moorestown, N. J., assignor to Radio Corporation of America, a corporation of Delaware

Application March 1, 1948, Serial No. 12,452

6 Claims. (Cl. 250—20)

1

Figure 1:
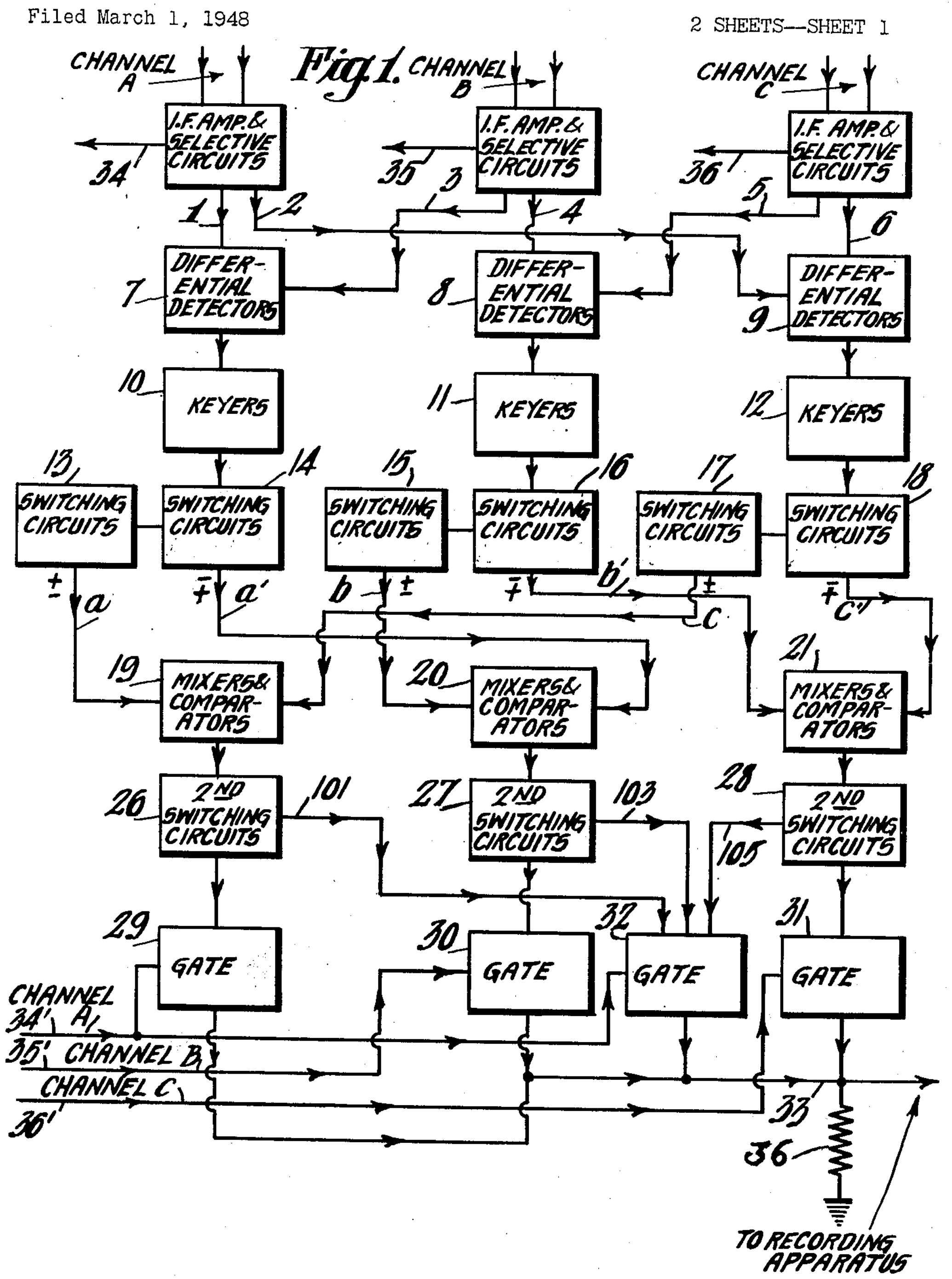

In this application, I disclose an improved diversity receiver system.

In diversity receivers of a known type, a plurality of versions of a signal are received on a plurality of receivers and the signals are compared as to strength and the strongest thereof selected for use, it being assumed that the stronger signal will have the least distortion. The plurality of versions of the signal may be subject to diversification by use of different frequencies or by being picked up by spaced antennas or by antennas of different characteristics. Where there are more than two versions of the signal, pairs thereof are compared as to strength in a manner such that each thereof is compared with the other and the strongest signal is selected for use. More specifically, the best signal is selected by comparing the plurality of signals two at a time and then comparing the resultants (N–1) at a time.

In systems as disclosed herein, the several signals in addition to being supplied to the signal strength comparing means are each supplied to a gating tube, there being a gating tube for each signal with a common output load for all of the gating tubes. The arrangement is such that the gating tube which is supplied with the strongest signal is made operative to pass the same to the output circuit. The resultant obtained by comparing strengths of the signals then controls the gating circuits so that the output from the signal channel getting the strongest signal appears in the common load and is used for recording or for reproduction as in a loudspeaker or in a television viewing tube and the like purposes.

An example of the system involved here is disclosed in Atwood U. S. application Serial #668,109 filed May 8, 1946 which has now ripened into Patent No. 2,492,780, dated December 27, 1949. Since, in practice, the actual diversity switching from one gate to another, as the relative strength of the signal in the several channels changes, requires a small but finite potential difference for operation, it is possible in practical applications that when the signals are nearly equal, none thereof will have control of the gating circuits. This situation may take place, for example, in a system such as disclosed in the said Atwood application. Then, since there is no control of the gating circuits, all of the gating tubes are inoperative, being biased beyond cut-off, and there is no signal set up in the common load. In other words, if the signals are of like strength, lock-out may occur in the system to interrupt the output, even in the presence of good signals on all of the channels.

2

The primary object of my invention is to provide means to prevent such an interruption or locking out of signals from taking place in case the same become of like amplitude and control of the gating circuits is lost by the signal strength comparing circuits and gate control circuits. This object is attained in accordance with my invention by providing additional circuits to select output from any predetermined one of the channels of the system when proper gating or switching as described hereinbefore does not occur. Since, at such time, all of the signals are of substantially like magnitude, it makes little difference which one of the signals is selected for output and as stated above, the output from any one thereof may be switched to the common load or outgoing channel.

In selecting the channel having the strongest signal, I make use of a differential detector operating a locking circuit of the type disclosed in general in Finch #1,844,950. In these locking circuits the devices have their anodes and control grids cross coupled and operate in such a manner that changes in the anode potential in one tube are applied to the grid of the other tube and vice versa so that if current is caused to flow in one tube, all or substantially all thereof is tripped to that tube and current is cut off in the other tube. I have provided an improved locking circuit for controlling the channel selection.

For descriptive purposes only, I have disclosed my improvement in a three-receiver diversity system quite like the receiver described in the aforesaid Atwood application.

In describing my invention in detail, reference will be made to the attached drawings wherein Fig. 1 illustrates by the use of rectangles and line connections three channels including the receiver detector in a three-channel diversity system.

Figure 2:
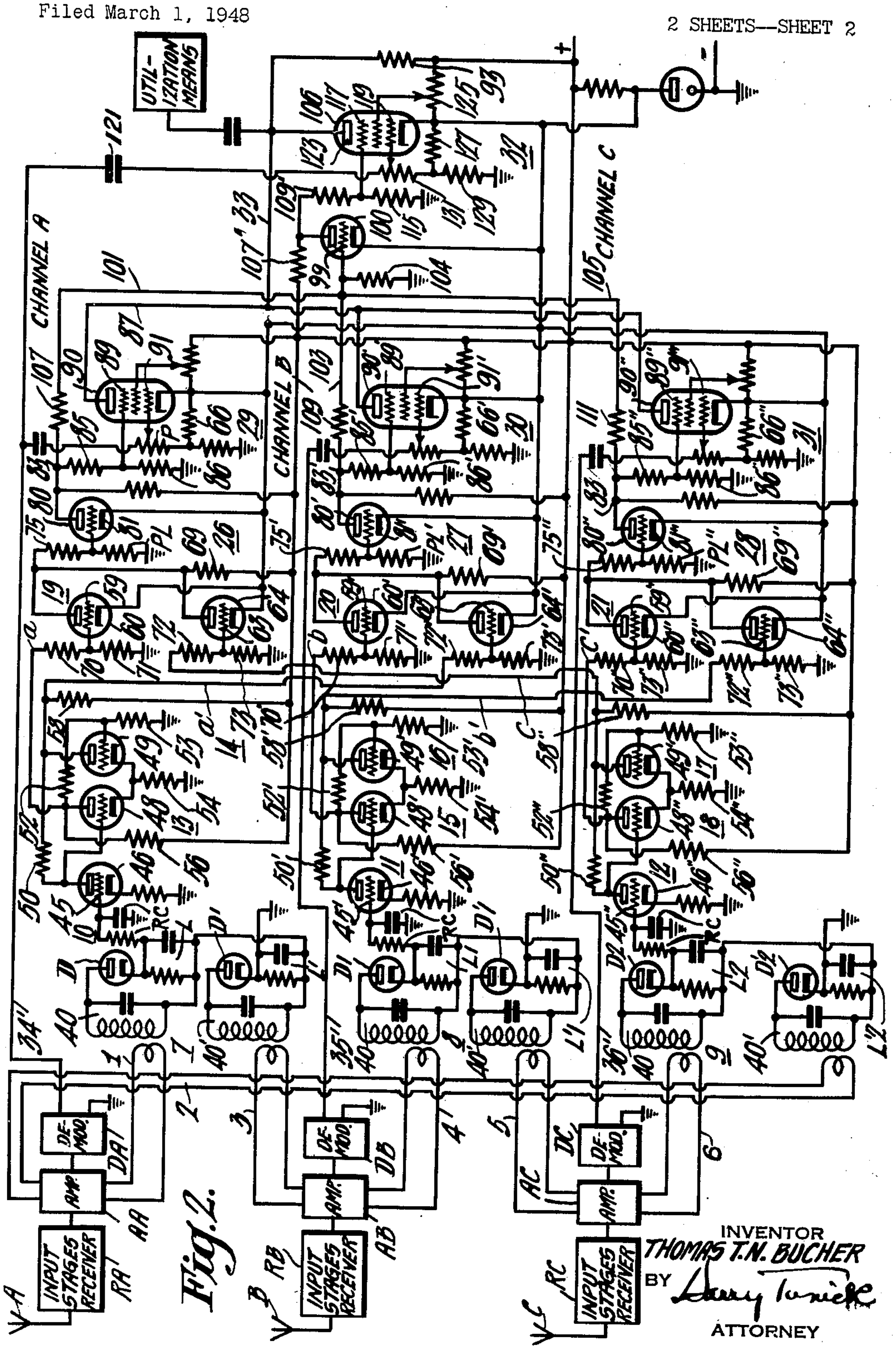

Fig. 2 illustrates details of a signal strength sensing and comparing circuit for comparing the relative strengths of the signals in two channels to derive a potential for channel selection purposes, my comparator apparatus for algebraically summing pairs of potentials each representing signal strength on a different channel, gating stages and control tubes therefor actuated by resultant potentials produced by such summation of the potential pairs. In an N diversity system (where N is greater than 3) the summation is in (N–1) groups. This figure also shows the additional gating system added and arranged in accordance with my invention for preventing locking out of the signal from the common load or output in the event the signals on the several channels are of like strength, and also illustrates the manner in which this apparatus is arranged in the several channels to attain the result desired.

In Fig. 1, I have omitted the antenna systems and radio frequency amplifiers and assume that IF signals from the intermediate frequency stages are coming in on channel A, channel B, and channel C. The signals from each channel are paired with signals from other channels and supplied to differential detectors 7, 8 and 9. The leads 1 and 2 of channel A then go to differential detectors 7 and 9, leads 3 and 4, of channel B go to differential detectors 7 and 8 and leads 5 and 6 of channel C go to differential detectors 8 and 9. The signals on channels A and B, for example, are compared in the differential detectors 7 and a resultant output is supplied to a keyer 10. The differential detectors may each, as illustrated in Fig. 2, comprise rectifiers with the rectifier outputs paired and connected in such a manner as to oppose the outputs from the two channels in each of the differential rectifiers 7, 8 and 9 to supply a resultant potential for control purposes. These resultant potentials are supplied to units 10, 11 and 12 which herein are designated as keying stages. In practice, they will be electron discharge devices controlled by the said resultant potentials to in turn control the condition of switching circuits 13, 14; 15, 16; and 17, 18. The switching circuits are represented by pairs of rectangles and in practice, might comprise as (in said Atwood application) shown in Fig. 2, locking tube or flip-flop tube stages which have two conditions of stability to which they can be tripped or flipped depending upon the absolute magnitude of the said resultant potential on the keyer or control tube in 10, 11 and 12. The flip-flop circuits then each supply potentials at points *a*, *a'*, *b*, *b'*, *c* and *c'*, the magnitude of which changes in opposite senses or directions when the flip-flop switching circuits are tripped. For example, when *a* is say positive, *a'* is more or less positive and vice versa.

Then, if for example, the signal in channel A is stronger, lead 1 supplies to the differential detectors in 7 a stronger signal than is supplied by lead 3 from channel B and the detectors 7 supply a resultant which swings in a direction to operate through keyer 10 to trip the switching circuits 13, 14 to a condition where the tube in 13 is non-conductive and the tube in 14 conductive. Then two potentials are derived on leads *a* and *a'* which change differentially and the potential at *a* might be positive and that at *a'* be relatively less positive. If the signal from channel B on line 3 should become stronger, the potential at the differential detector output might swing in the other direction to operate through keyer 10 to flip the trigger circuit in 13 and 14 to its other condition of stability at which the output at *a* would be less positive than the output at *a'*. Differential detectors 8 and 9 are operating in a similar manner to compare signals from two of the channels and to act through control stages or keyers 11 and 12 to actuate the flip-flop circuits in the switching units in 15, 16 and 17, 18 in a similar manner to supply at *b* and *b'* and *c* and *c'* potentials which vary differentially. By use of flip-flop or trigger type circuits in the switching units, the transition between conditions of stability thereof is very rapid.

The outputs of the switching circuits are now in effect summed in pairs (compared) preferably by mixing and comparator stages 19, 20 and 21.

The mixing stages may, as shown more in detail in Fig. 2, each comprise a pair of electron discharge devices, 60, 64, 60', 64', 60'', 64'' respectively. The devices of each stage are supplied with output from a selected side of the flip-flop switching circuits 13, 14; 15, 16; 17, 18. For example, consider again only channel A, mixing and comparing stage 19. Stage 19 receives output from the sides 13 and 17 of the trigger circuits for channels A and C. Switch element 13 produces a higher voltage than switch element 14. This assumption is made for purposes of illustration, it being assumed channel A has the stronger signal, so that the potential at *a* is stronger than at *a'*. Similarly, the side 17 of that flip-flop circuit for channel C is assumed to supply to *c* a potential which is more positive than the potential at *c'* because it is to be recalled, channel A has the stronger signal and is compared with channel C in detector 9 to trip the flip-flop circuit in 17, 18 in a direction to supply a more positive potential at point *c*. The mixing and comparison stage 19 is such as to key on the second switching circuits in 26 when both elements 13 and 17 produce at *a* and *c* respectively relatively high voltages and to key off the second switch 26 when either or both of these elements produce relatively low voltages. Switch 26 operates a gating stage 29. The arrangement including mixers and comparators 19, second switching circuits 26 and gating tubes 29 are as described in detail hereinafter and illustrated in Fig. 2 of the drawings.

When the switch 26 makes gate stage 29 operative, channel A is coupled through lead 34' and gate 29 to the output lead 33 and common load resistor 36. Therefore, whenever channel A is stronger than both channels B and C, the channel A output is supplied to output lead 33 and load 36. If the channel B, for example, should now become strongest, the position of the flip-flop circuits 13 and 14 is reversed and the position of the flip-flop circuits 15 and 16 is such that the second switching circuit 27 is now keyed on and the second switching circuits 26, 28 are turned off so that output is supplied through lead 35' and gate 30 to lead 33 and the output load 36. It is usually convenient to gate the signals after demodulation then a demodulator is included in each channel in the branches 34', 35' and 36'. Where gating is to be done at I. F. a common detector is coupled to the common load 36. Where frequency shift or similar signals are being received, current amplitude limiters and discriminators may be used in the branches 34', 35' and 36' ahead of the detectors. Where gating takes place before detection, a single limiter and discriminator arrangement is used in the connection to the common load 36.

In Fig. 2, I have illustrated the essential elements of the differential detectors 7, 8 and 9, the keyers 10, 11 and 12, the switching circuits 13, 14 and 15, 16, 17 and 18, and the mixer and comparator stages 19, 20 and 21. This figure also shows details of the second switching stages 26, 27 and 28, the gating stages 29, 30 and 31, the separate gating stage 32 and the interconnections between the various elements necessary to carry out the operation desired.

The channels comprise antennas A, B and C feeding input stages of receivers RA, RB and RC. The receivers may be conventional with the usual radio frequency amplifier, first heterodyning stages, first IF stages and so forth. The receivers supply output to amplifiers AA, AB and AC which may also be substantially conventional and may include intermediate frequency amplifiers with, if desired, a second heterodyne oscillator and mixer. The amplifiers AA, AB and AC each have three outputs. Two of these outputs are of intermediate frequency and are shown at leads 1 and 2 for channel A, leads 3 and 4 for channel B and leads 5 and 6 for channel C. The amplifiers also supply output to a demodulating means DA, DB and DC. As pointed out above, these demodulating means include current amplitude limiters, discriminators and so forth, where gating is to take place after detection. Then the demodulated signal is fed to leads 34', 35' and 36' to excite the gate stages. In the event gating is to take place before detection, IF output is supplied to the leads 34', 35' and 36'.

In Fig. 2, 7 designates generally the differential detectors which compare and detect signals from channel A and channel B. 40 and 40' represent tuned circuits in the channel outputs from leads 1 and 3. These outputs are taken from the circuits at a point prior to limiting because the signal strengths are used in the channel selection. Across each tuned circuit is connected in series a diode rectifier and its load. The diodes are designated D and D' and the loads are labeled L and L'. The two loads L and L' are differentially connected with respect to the diodes and the alternating current circuits and one diode load, say L' is grounded at the diode cathode end so that at the cathode of the diode D, a potential is produced which changes as the signal strength in channel A and channel B changes. The free end of load L is connected by a filter network RC to the grid of a keyer tube 46 which is in the keyer unit 10 and has been so labeled generally. If the channel A is stronger as has been assumed hereinbefore, the potential at D will be positive and this positive going potential is supplied to the control grid 45 of the keyer tube 46. When the opposite condition exists, and channel B is the strongest, the potential at the upper end of load L will swing in the negative direction and then this negative potential is applied to the control grid 45 of the keyer tube 46.

Tubes 48 and 49 comprise a trigger or flip-flop circuit of a novel type each tube having an anode, a control grid and a cathode with their anodes and control grids cross coupled by resistors 50 and 52 and their cathodes connected to ground by a common resistor 54 and their anodes coupled by separate anode resistors 56 and 58 to the positive terminal of a D.-C. source, the negative terminal of which is grounded. The tube 46 is in the grid biasing circuit of the tube 48 while the resistor 53 is in the grid biasing circuit for the tube 49. The arrangements are such that when current flows in one tube, say 48, it is cut off in the other tube 49. This operation being well known in the art will not be described in detail herein. When current is in one trigger tube, say 48, the switching circuit is considered in one stable condition and when it flows in the other tube 49, it is considered in the other of its two stable conditions. When the resistance of the keyer tube 46 varies by virtue of the varying grid voltage, the switching circuit will change from one of its stable conditions to the other. When the resistance of tube 46 is high, the tube 48 will be conductive and when the resistance of tube 46 is low, this tube will be non-conductive and the tube 49 will be conductive. This is because when the tube 46 resistance is low, the control grid of tube 48 swings in a negative direction since the tube 46 draws heavy plate current. By properly proportioning the resistors, the transition or switching action will occur in the vicinity of zero volts on the grid 46. Actually, there will be a differential voltage between the switching voltages required when going in opposite senses, as mentioned hereinbefore. When the channel A signal is stronger, the keyer grid 45 voltage is positive, the keyer grid resistance is low and the right hand tube 49 of the flip-flop circuit will be conductive. Then the potential at its anode will swing in a negative direction. At the same time, since the tube 48 is non-conductive, its anode potential will swing in a positive direction. Then the lead *a* connected to the anode of tube 48 will be highly positive and the lead *a'* connected to the anode of tube 49 will be less positive. The reverse conditions will obtain when the B signal is stronger.

In the locking circuit described here, it will be noted that the tube impedance 46 with resistor 50 comprises the biasing circuit for the tube 48 and the use of this tube 46 improves the operation of the triggering circuit, which is now less critical to circuit resistor values. In these connections keying is the result of a slowly varying and irregular signal, and it is necessary to use direct coupling in the keying circuit. In applications, a D.-C. keying tube is used to control the direct current through the grid resistor of one tube of the trigger circuit. To do this, it was necessary to have the diodes floating above ground potential, as well as the cathode of the keying tube. With some tubes, this is likely to result in hum. The present circuit eliminates this difficulty by permitting one of the diode cathodes to be grounded, and permitting the cathode of tube 46 to be grounded through its biasing resistor.

In the mixing and gating circuit of Fig. 2, it is assumed that the potential developed at lead *a* (channel A) in unit 13 of Fig. 1 is supplied to the control grid 59 of tube 60 designated generally as the mixer and comparator 19 of one of the channels. This tube 60 has its cathode tied to the cathode of a second tube 64 and to a relatively high positive voltage point on the voltage divider 66. The anodes of the two tubes 60 and 64 are tied together and connected by load resistor 69 to the supply source. Load resistor 69 is in a voltage divider circuit including voltage reducing resistor 75 and the common output load resistor PL, one end of which is connected to ground. To each grid is fed a signal from one of the switching circuits. The grid 59 of tube 60 is supplied from lead *a* for example, while the grid 63 of tube 64 is connected to lead *c* from the switching tube 49'' of switching stage 17. Potential dropping resistors 70 and 72 and biasing resistors 71 and 73 are included in these connections. The potential at the lead *a* represents, as stated above, the strongest signal on the A and B channels. When the signal in channel A and potential in lead *a* is large (corresponding to a condition where the signal on channel A is stronger than the signal on the channel to which it is compared), the tube 60 conducts, while when the signal is low, it is cut off. The same remarks apply to the potential at *c* and tube 64. When neither tube is conducting, the voltage across load PL approaches a value determined by the supply voltage and the bleeder current flowing in the voltage divider resistors 69, 75 and PL. With both tubes conducting, heavy current flows in the tube circuits and the plate voltages thereof and the voltage across PL assume a low positive value. With only one tube conducting the plate voltage and the voltage across the load PL assume an intermediate value.

The resistor PL is in the grid circuit of the D.-C. amplifier tube or electron control device 80. Whenever the voltage across PL tends to be above the voltage on the cathode 81 of tube 80, tube 80 becomes conductive and this tends to hold the voltage across PL very nearly at the voltage of the cathode 81 of tube 80. The tube 80 is in the second switching circuit 26. This D.-C. amplifier tube 80 has an anode load resistor 85 in the grid circuit of a gating tube 90 in gate stage 29. The cathode of the tube 80 like those of tubes 60 and 64 is biased to a relatively high value by potential divider 86. The values of the load resistor PL for the mixing and combining tubes 60, 64 and the coupling resistors 85, 86 feeding the potentials to the grid 89 of tube 90, are so chosen that with neither or one only of the mixer tubes 60 and 64 conducting the D.-C. amplifier 80 will conduct, but with a low positive voltage across PL caused by both mixer tubes conducting, the D.-C. amplifier 80 will be biased beyond cut-off. The output of the D.-C. amplifier feeds through resistor 85 to the gating grid 89 of a gating tube 90 and by lead 101 and resistor 107 to the extra gating tube in unit 32 which is shown in detail at the right of the gating stages 29, 30 and 31. The tube or gate device 90 has its control grid 91 coupled to one of the signal input channels, here shown as to lead 34′ of channel A. It has its anode coupled to the common output lead 33 and by resistor 93 to the D.-C. source. The outputs from the gate stages 30, 31 for channels B and C and from the gate tube 32 are also coupled by lead 87 to the output lead 33.

When the tube 80 is conducting, its plate voltage is low and the gating grid 89 of tube 90 is positive relative to ground but is negative relative to its cathode, to thereby prevent plate current from flowing in the gating tube output circuit. When the tube 80 is non-conducting and its plate voltage is high, the gating tube grid 89 potential is less negative and this permits the gating tube plate current to flow. This current is modulated by the signal from channel A on lead 34′ which is applied to the signal grid 91 of the gating tube 90. A potentiometer P is included in these connections to adjust the magnitude of the signals fed to the control grid 91.

As all of the gating tubes from channels A, B, C as well as the extra gating tube in unit 32 are connected to the same plate load, the output corresponds to the channel the gating tube of which allows plate current to flow at a particular time. In the example given, when channel A is stronger than both B and C, a high positive voltage will be supplied to the mixer lead $a$ and a high positive voltage will be supplied to the mixer tube lead $c$. Thus, the potential on the control grid of tube 80 will swing down, making this tube nonconductive to render tube 90 conductive to pass signals from channel A. At that time, the gating tubes 90′, 90″ of stages 30 and 31 of the other channels are cut off because neither of their stages 20 or 21 receive two positive going potentials from the remaining leads $a'$, $b$, $b'$ and $c'$. Similar operation will occur for channels B and C in case one of these has the strongest signal.

In practice, the keyers and switches of units 10, 13 and 14 do not normally switch or flip at exactly the same voltage representing equal inputs on both channels A and B. For example, when channel A becomes dominant, switching may occur in 13, 14 at +0.1 volt detector output whereas when channel B becomes dominant, switching may occur in 13, 14 at −0.1 volt detector output. In some cases, this condition may be made unimportant by making this differential a very small part of the voltages being compared. However, it is not necessary for good operation to require switching when the signals are very nearly equal, and, in fact, it is better practice to limit switching until there is a difference in signal level of several db. When switching does occur only when a moderate difference between signals exists, occasions may arise where none of the gates 29, 30 or 31 are open or operative. One example of this condition is when switch elements 13, 15 and 18 are simultaneously in the high voltage position, and leads $a$, $b$ and $c'$ swing in the positive direction. Then the mixer tube 60 is conductive but mixer tube 64 is not conductive. Under these conditions, an intermediate amount of current flows in the load PL and tube 80 conducts to bias tube 90 to cut off. The same conditions exist in the mixer stages in 20 and 21 so that the gate tubes in 30 and 31 are also cut off and no signal is applied to the output load 36. This condition may exist under the following conditions. Channel A has the strongest signal, and B is stronger than C. The trigger tube in 14 (49, Fig. 2) is conductive, as are the trigger tubes in 16 and 18. Signal B fades sufficiently below signal C, that the trigger tube in 15 becomes conductive. This makes the trigger tube 16 nonconductive. Signal B then rises above signal C, but not sufficiently to alter the conductive conditions of 16 and 15 because of the differential between the tripping voltages discussed above. Then A channel signal fades sufficiently below B to cause tube 13 to become conductive, but not sufficiently below C to make tube 18 non-conductive. Now, tubes 13, 15 and 18 are simultaneously conductive, and tubes 14, 16 and 17 are non-conductive. Thus, only one of the mixing tubes 60 and 64 of unit 19 and the corresponding tubes of units 20 and 21 has a positive grid, and insufficient current flows in the load resistors 69, etc. to bias tube 80 to cut off. Since these tubes draw current, none of the gates 29, 30 and 31 are open to pass signal to the output load 36. As a consequence, so long as none of the signals A, B or C exceeds both of the other signals sufficiently to cause switching, no output will result. Specifically all signals may now become equal, and very good, but there will be no output, since the gates are all biased to prevent application of signals from the limiters, discriminators, and detectors in the connections 34′, 35′ and 36′ to the coupling device, where demodulation takes place ahead of gating.

To overcome this difficulty and to insure continuous operation even when the signals are of about the same magnitude so that selection thereby cannot be made and when all gating stages are in the inoperative position, I provide an additional gating stage 32. This gate 32 is open when all of the gates 29, 30 and 31 are cut off or closed. Gate 32 may be in any of the channels A, B or C and has been shown in channel A. The gate stage 32 is actuated by potentials developed in switches 26, 27 and 28 to be operative when the individual channel gating potentials developed in these comparators are such as to turn off gates 29, 30 and 31 or leave the same turned off.

To do this, I provide gate stage 32 including control tube or electron control device 100 and gate tube or gate device 106. Connections from stages 26, 27 and 28 to the control grid 99 of tube 100 are provided for keying the additional gate tube 106 in the extra gating stage 32. The anode of the tube 100 is coupled by resistor 107′ to the D.-C. source and resistor 107′ is in a voltage divider circuit including resistors 109′ and 115. The lead 101 is then connected to a point 83 in the switching stage 26 of Fig. 2. A resistor 107 is included in this lead. Leads 103 and 105 are connected to similar points in the remaining switching stages 27, 28 for channels B and C respectively, and resistors 109 and 111 are included in these leads. The three potentials supplied from point 83 and corresponding points 83′ and 83″ are fed to the control grid 99 of tube 100, wherein they are mixed and/or combined. The mixing resistors 107, 109, 111, 104 are so proportioned that when the plate voltages of the D.-C. amplifiers 80 of all of the channels are low, the D.-C. amplifier 100 will be biased to cut off in which case, the potential of grid 117 of the additional gate stage will be high to let this additional gate tube pass signal from any of the channels connected to its control grid. In the embodiment illustrated, channel A is used. The control grid 119 of tube 106 is accordingly coupled to the lead 34′ by coupling capacitor 121 which feeds the signal (before or after detection) to the extra gating tube. Note that at this time, since the D.-C. amplifier 80 plate voltages are all low, all of the gates 29, 30 and 31 are cut off. When one of the channel D.-C. amplifier 80 plate voltages is high, the D.-C. amplifier 100 is conductive so that its plate potential is low to thereby bias the extra gating tube 106 to cut off. Accordingly, when the D.-C. amplifier 100 is cut off, the gating tube 106 supplies output to the lead 33. When the D.-C. amplifier 100 is conducting, the gate tube 106 is cut off and output is supplied from that channel whose D.-C. amplifier tube 80 is non-conductive. The anode 123 of gate tube 106 is coupled to the output lead 33 and thus to the utilization means. The voltage divider including potentiometer resistor 125 and resistors 127 and 129 supplies appropriate potentials to the control grid 119 relative to the cathode and operating potentials to the screen grid. The cathode is positive relative to ground. The grid is biased suitably by potentiometer resistors 127 and 129. The potentiometer 131 applies signals of adjustable level to grid 119. The arrangement is such that when tube 100 is conductive, grid 117 cuts off current in tube 106.

What is claimed is:

1. A diversity receiving system comprising in combination, a plurality of signal amplifiers, a plurality of gate devices one coupled to the output of each amplifier, a common output impedance coupled to all of said gate devices, selecting means actuated by the difference in strengths of the several signals in the several amplifiers for making conductive that gate device getting the strongest signal to predominantly supply output to said common impedance, and apparatus for supplying output to said common impedance in response to a condition of a difference in amplifier signal strengths which is insufficient to cause actuation of said selecting means to make conductive any of the gate devices, comprising an additional gate device coupled to the output of one of said amplifiers, and means, coupled to said selecting means and actuated thereby in response to a nonconductive condition of all of said first-named gate devices, for making conductive said additional gate device.

2. A diversity receiving system comprising in combination, a plurality of signal channels, a plurality of gate devices one coupled to each channel, a common output impedance coupled to all of said gate devices, channel selecting apparatus including means for comparing the relative strengths of the signals in the several channels and control apparatus actuated thereby for making conductive that gate device in the channel having the strongest signal, and apparatus for supplying output to said common impedance in response to a condition of a difference in signal strengths in the several channels which is insufficient to cause actuation of said control apparatus to make conductive any of the gate devices, comprising an additional gate device coupled to said common impedance and to one of said channels, and apparatus, actuated by said control apparatus in response to a nonconductive condition of all of said first-named gate devices, for making conductive said additional gate device.

3. A diversity receiving system comprising in combination, a plurality of signal channels, a plurality of gate devices one coupled to each channel, a common output impedance coupled to all of said gate devices, channel selecting apparatus including detectors for comparing the relative strengths of the signals in the several channels and control apparatus actuated by the detector outputs for making conductive that gate device in the channel having the strongest signal, and apparatus for supplying output to said common impedance in response to a condition of a difference in signal strengths in the several channels which is insufficient to cause actuation of said control apparatus to make conductive any of the gate devices, comprising an additional gate device coupled to one of said channels, and apparatus, coupled to said control apparatus and actuated thereby in response to a nonconductive condition of all of said first-named gate devices, for making conductive said additional gate device.

4. A diversity receiving system comprising in combination, a plurality of signal channels, a plurality of gate devices one coupled to each channel, a common output impedance coupled to all of said gate devices, channel selecting apparatus including means for comparing the relative strengths of the signals in the several channels and control apparatus actuated thereby for opening that gate device in the channel having the strongest signal, and apparatus for supplying output to said common impedance in response to a condition of a difference in signal strengths in the several channels which is insufficient to cause actuation of said control apparatus to open any of the gate devices, comprising an additional gate device coupled to said common impedance and to one of said channels, and apparatus, actuated by said control apparatus in response to the existence of the same condition in all of said first-named gate devices, for making conductive said additional gate device.

5. In apparatus for selecting the strongest signal from a plurality of signals, in combination, detectors for comparing the relative strengths of said signals and for producing a plurality of potentials the relative values of which indicate which signal is the strongest, a gating stage excited by each signal, a common output circuit coupled to all of the gating stages, an electron control device connected to each gating stage and responsive to a respective produced potential for rendering operative that gating stage excited by the strongest signal to supply such signal to said output circuit, and means for supplying signal to said output circuit in response to the failure of the aforesaid selecting apparatus to make a selection, comprising an additional gating stage excited by one of said signals, and control apparatus for said last-named gating stage, operating alternatively with respect to the operation of the aforesaid control devices, in response to an inoperative condition of all of said first-named gating stages, to render said last-named gating stage operative.

6. Apparatus as recited in claim 4, wherein said last-named apparatus is an additional electron control device having input electrodes coupled to the first-named control devices and having output electrodes coupled to said additional gating stage.

THOMAS T. N. BUCHER.

REFERENCES CITED

The following references are of record in the file of this patent:

UNITED STATES PATENTS

| Number | Name | Date |
|---|---|---|
| 2,269,594 | Mathes | Jan. 13, 1942 |
| 2,293,565 | Schock | Aug. 18, 1942 |